United States Patent [19]

Kwon et al.

[11] Patent Number: 4,613,366
[45] Date of Patent: Sep. 23, 1986

[54] CONTINUOUS REACTIVE METAL REDUCTION USING A SALT SEAL

[75] Inventors: Young J. Kwon, Fruit Heights, Utah; Richard A. Stoltz, Murrysville Boro, Pa.

[73] Assignee: Westinghouse Electric Corp., Pittsburgh, Pa.

[21] Appl. No.: 739,420

[22] Filed: May 30, 1985

[51] Int. Cl.[4] .............................................. C22B 5/02
[52] U.S. Cl. ...................................... 75/84.5; 75/89; 75/93 E; 266/166; 266/905
[58] Field of Search .................. 75/84.5, 89, 93 E; 266/905, 166

[56] References Cited

U.S. PATENT DOCUMENTS

| 3,977,866 | 8/1976 | Othmer | 75/84.5 |
| 4,487,677 | 12/1984 | Murphy | 75/84.5 |
| 4,508,322 | 4/1985 | Kimura et al. | 75/84.5 |
| 4,518,426 | 5/1985 | Murphy | 75/84.5 |

Primary Examiner—Stephen J. Lechert, Jr.
Attorney, Agent, or Firm—R. A. Stoltz

[57] ABSTRACT

This is a method for reducing the chlorides of zirconium, hafnium, or titanium. It utilizes a solidified magnesium (or sodium) chloride matrix in which chunks of the product metal are contained as a seal on the bottom of the reduction vessel. A withdrawal mechanism is used in conjunction with a cooling means (e.g. water jacket) to slowly withdraw the product metal chunks in the salt matrix. This invention makes possible the operation of the reduction process as a continuous process.

13 Claims, 3 Drawing Figures

CONTINUOUS REACTIVE METAL REDUCTION USING A SALT SEAL

CROSS-REFERENCE TO RELATED APPLICATIONS

A method for reduction of chlorides of reactive metals (zirconium, hafnium, or titanium), is described in related application Ser. No. 739,418 filed 5/30/85 assigned to the same assignee. That related application also uses a seal at the bottom of the reduction vessel, but that seal is accomplished by a means of a seal metal which is predominantly either zinc or tin and utilizes recovery of the seal metal from the distillation step and recycling of the seal metal to the reduction vessel.

BACKGROUND OF THE INVENTION

The present invention relates to a method for reducing reactive metals (zirconium, hafnium, or titanium) from a chloride to metallic form, and in particular to a process which lends itself to continuous production.

Zirconium, hafnium, and titanium are commonly reduced from the chloride by means of a reducing metal such as magnesium or sodium. At the present time, the commercial processes are batch-type processes. U.S. Pat. No. 3,966,460, for example, describes a process of introducing zirconium tetrachloride vapor onto molten magnesium, with the zirconium being reduced and traveling through the magnesium layer to the bottom of the reactor and with the by-product magnesium chloride being periodically removed.

In commercial processes, a portion of the by-product salt (e.g. magnesium chloride) is removed manually after the batch has been completed and cooled, and the remainder of the salt and the remaining excess reducing metal is reduced in a distillation or leaching process.

SUMMARY OF THE INVENTION

This is a process, which can be continuous, for reducing a chloride of zirconium, hafnium, or titanium to produce a product metal. It provides a practical way of removing product metal from the reaction vessel. It uses a layer of magnesium chloride in the reduction vessel, the magnesium chloride having an upper molten portion and a lower solid portion, with the lower solid portion being located adjacent to a cooling means (such as a water jacket) to maintain a liquid tight seal at the bottom of the vessel. The layer of molten magnesium is established on top of the layer of magnesium chloride and gaseous chloride of the product metal (e.g. zirconium chloride) is introduced above the magnesium, thus causing a reaction which produces product metal chunks (e.g. zirconium typically containing some residual magnesium) which settle through the molten magnesium chloride and collect on top of the solid portion of the magnesium chloride. The lower portion of the solid magnesium chloride is at least periodically (and possibly continuously) withdrawn which causes a portion of the molten magnesium chloride to be relocated adjacent to the cooling means and thereby solidified. This maintains a seal at the bottom of the vessel while product metal (e.g. zirconium) chunks are trapped within the solidified magnesium chloride, thus providing for withdrawing of product metal from the vessel together with solidified magnesium chloride. The log (magnesium chloride containing product metal chunks) is then heated in a distillation furnace to remove the magnesium chloride and residual magnesium and to consolidate the product metal chunks. The consolidated metal chunks are melted to form an ingot of product metal (e.g. an ingot of zirconium). In some cases, the distilled and consolidated product metal chunks are rolled to produce a spar, prior to vacuum arc melting.

BRIEF DESCRIPTION OF THE DRAWINGS

The invention can be best understood by reference to the following drawings, in which.

DESCRIPTION OF THE PREFERRED EMBODIMENTS

As previously noted, commercial processes for reduction of zirconium, hafnium, or titanium chlorides to their metals have been batch-type processes. This is due in large part to the difficulty of removing the product metal during the reduction operation. While semicontinuous processes have been proposed (see, for example, J. E. Mauser, "Production of Zirconium by the Semicontinuous Reactor Process" RI5759, U.S. Bureau of Mines, 1961; or W. W. Dunham, Jr., and R. D. Toomey, *Journal of Metals*, volume 11, No. 7, July 1959, pages 438–440), the commercial processes have remained as batch type processes. This invention provides for removal of the product metal at least periodically while continuing the reduction process, and preferably, in addition, for turning the product metal into ingot form.

Figure 1:
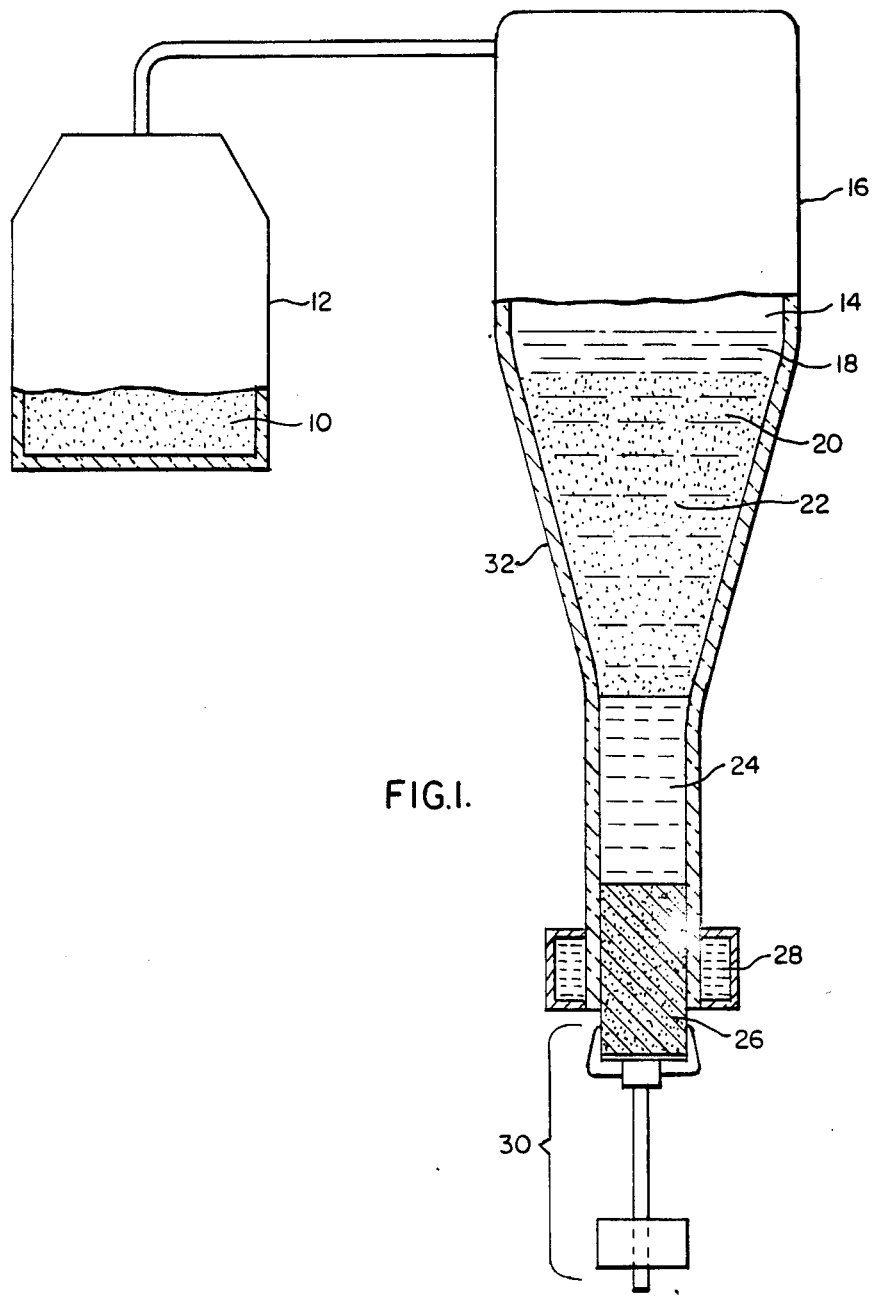
FIG. 1 shows the invention using zirconium tetrachloride being reduced by magnesium.

FIG. 1 shows one embodiment of the invention in which zirconium tetrachloride particles 10 are sublimed in a sublimer vessel 12 and the zirconium tetrachloride vapor 14 is introduced into a reducing vessel 16 where the vapor comes in contact with a layer of molten magnesium 18, reacting to produce chunks of zirconium 20 which settle down through the molten magnesium layer 18, through the molten magnesium chloride 22 and come to rest on the top 24 of the solid portion of the magnesium chloride 26. Under steady state conditions, the solid portion of the magnesium chloride 26 is zirconium contained in a matrix of magnesium chloride and magnesium. This solid portion 26 provides a seal at the bottom of the vessel 16. Cooling means 28, such as a water jacket, is provided to maintain the lower portion of the seal solid. Withdrawal means 30 is provided to slowly withdraw a portion of the solid material (zirconium in a magnesium chloride matrix) from the vessel 16. FIG. 1 shows a vessel with a tapered portion 32 to allow the zirconium chunks 20 to funnel down to the solid-molten interface of the magnesium chloride. Preferably a portion of the lower cylindrical section 24 extends above the cooling means 28 and provides a cylindrical shape to the solid portion 26.

Figure 2:
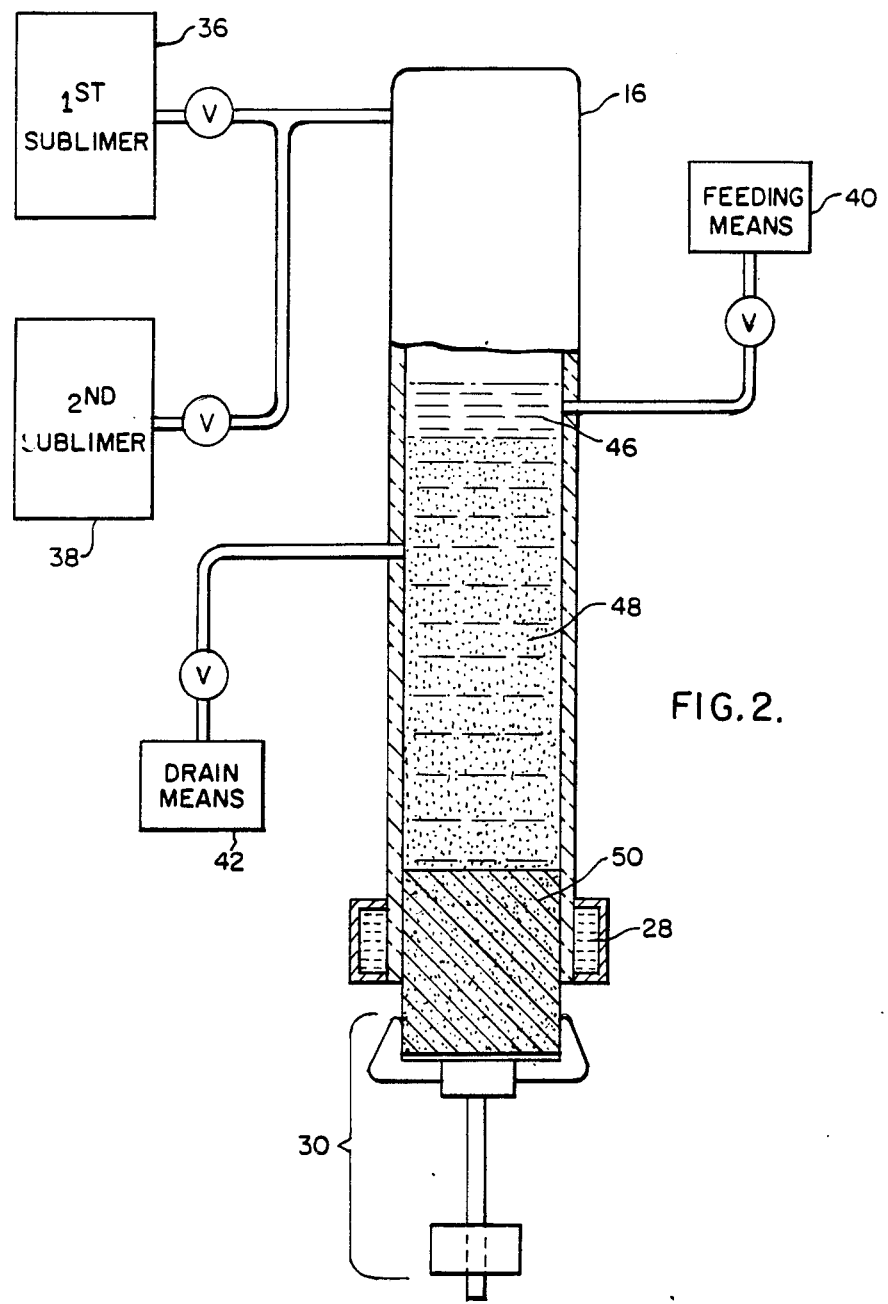
FIG. 2 shows the invention as used in a continuous process.

FIG. 2 shows an embodiment for continuous production. A first sublimer 36 and a second sublimer 38 are used such that one sublimer can be refilled while the other is feeding the vessel 16. Feeding means 40 is used to at least periodically (and possibly continuously) feed reducing metal (e.g. magnesium but possibly sodium) into the vessel 16. Drain means 42 is used to at least periodically (and possible continuously) remove reducing metal chloride (e.g. magnesium chloride, but possibly sodium chloride) from the vessel 16. Preferably the levels of the reducing metal 46, molten reducing metal chloride 48 and solid reducing metal chloride 50 are maintained relatively constant.

Figure 3:
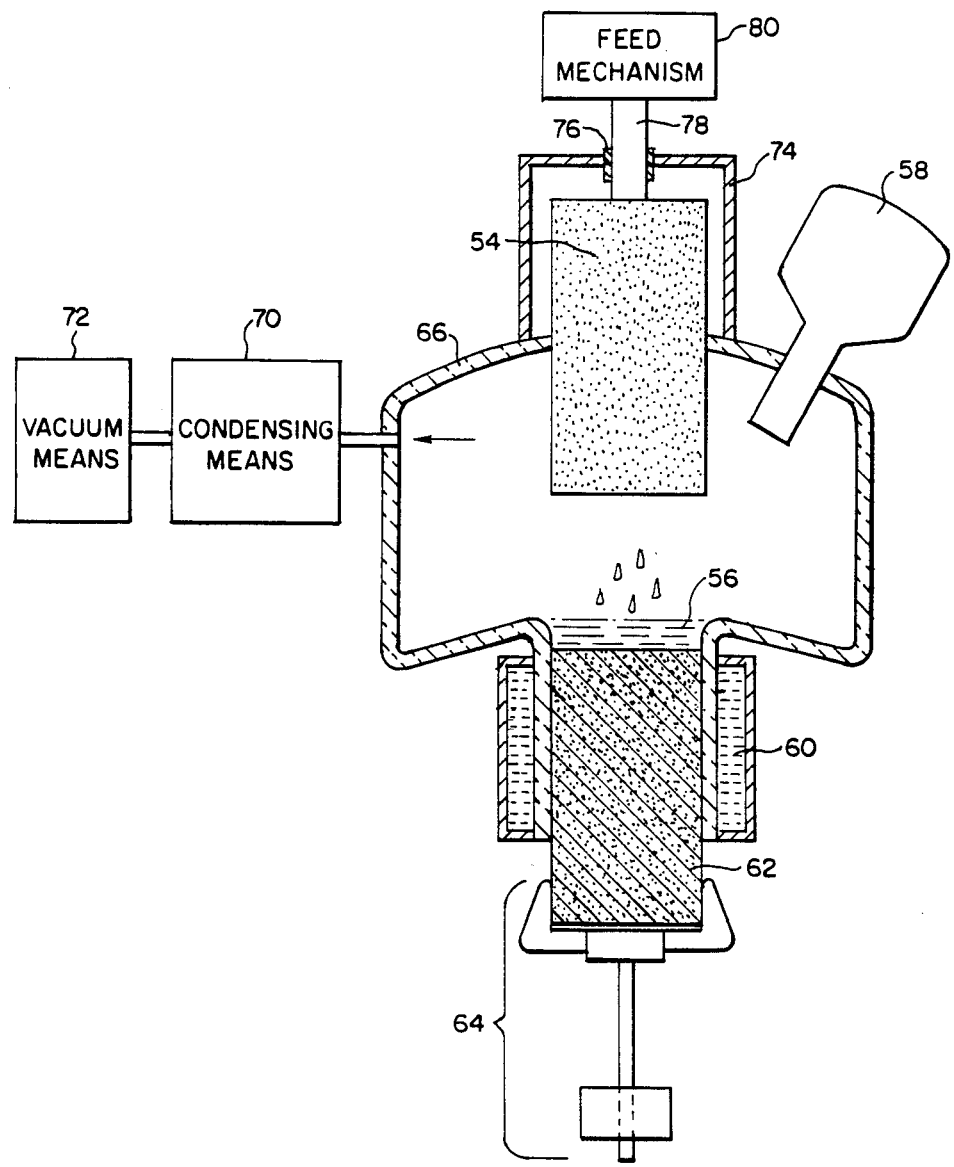
FIG. 3 shows, in simplified form, an electron beam melting apparatus for producing an ingot of product metal.

FIG. 3 is a simplified drawing of an electron beam furnace for producing an ingot of relatively pure product material. Although such a furnace could be used directly on the log (zirconium in a matrix of magnesium chloride and magnesium) and thus be removing a relatively large amount of magnesium chloride and residual magnesium in a combined distillation-melting step, preferably the distillation step is performed separately prior to the electron beam furnace operation. Again referring to FIG. 2, it can be seen that the log, will increasingly stick out of the bottom of the vessel 16 and that at some point some of the log can be cut off and removed, with the withdrawal mechanism 30 being repositioned to attach to the remaining solid portion 50. This log can then be distilled in a distillation furnace which vaporize off the magnesium chloride, distills of residual magnesium, and allows consolidation of the chunks of zirconium in a generally cylindrical configuration. FIG. 3 shows the cylinder to be melted 54 positioned above a pool of purified product metal 56. The pool 56 is melted by an electron beam gun mechanism 58. Melting proceeds relatively slowly such that impurities which reached the molten pool 56 will have time to volatilize from the surface of the pool. A cooling jacket 60 is provided to solidify the purified material to produce an ingot 62 of purified material. A withdrawal mechanism 64 is attached to the bottom of the ingot 62. Impurity vapor of residual magnesium chloride and magnesium is withdrawn through condensing means 70. A vacuum means 72 is provided to maintain a very low pressure in the chamber 66.

Again while the distillation and melting to an ingot both can be performed in an electron beam furnace, it is preferable to perform a distillation-sintering operation prior to the melting operation. After the magnesium chloride and the remaining magnesium are distilled off, the relatively pure zirconium chunks sinter. It should be noted that this produces a relatively porous material which does not allow sealing against its (typically cylindrical) sides. Thus a feed material chamber 74 is provided with a seal 76 which seals against a feed rod 78. Thus the cylinder of porous product material 54 is attached to the feed rod 78 which is in turn connected to the feed mechanism 80. The feed mechanism 80 causes the porous cylinder 54 to slowly be feed down to a position where its lower end is melted by heat from the pool 56.

Preferably the log is distilled in a form made of product metal (e.g. zirconium), which form is appropriately shaped for an "electrode" for electron beam or vacuum arc melting. The chunks consolidate to each other and to the form. Holes are provided top and bottom (and preferably also through the typically cylindrical sides) such that the magnesium can distill off and the magnesium chloride can drain. Being of at least generally of product metal (possibly including alloying elements) the form can be melted along with the chunks when the cylinder of product material is electron beam or vacuum arc melted. As the "cylinder" is relatively porous a feed rod and seal should be used as described above.

Although the examples have illustrated the invention with zirconium, magnesium, and magnesium chloride, it can be seen that hafnium or titanium can be similarly processed and that sodium can be substituted for magnesium which will thus produce sodium chloride, rather than magnesium chloride.

It should also be noted that after distillation, the log is in sponge form and can be crushed and processed by conventional commercial methods (e.g. pressed into discs which are welded to form an electrode and then double vacuum arc melted).

In addition, the distillation can be provided which allows the chunks of product material to settle into a non-cylindrical form. This can be especially convenient if the material is to be rolled into a spar for a vacuum arc melting electrode as described in co-pending application Ser. No. 541,404, filed by Weber on Oct. 13, 1983.

While shapes other than cylindrical can also be used for the bottom of the reducing vessel 16 (e.g. a square cross section could be used), cylindrical portions having a circular cross section are preferred.

The invention is not to be construed as limited to the particular forms described herein, since these are to be regarded as illustrative rather than restrictive. The invention is intended to cover all processes which do not depart from the spirit and scope of the invention.

We claim:

1. In a process of the type wherein a chloride of zirconium, hafnium, or titanium is reduced with magnesium to produce a product metal, and the product metal is subjected to a distillation process to remove residual magnesium and magnesium chloride; the improvement comprising:
    (a) establishing a layer of magnesium chloride in a vessel, magnesium chloride layer having an upper molten portion and a lower solid portion, said lower solid portion being located adjacent to a cooling means and maintaining a liquid tight seal at the bottom of said vessel;
    (b) establishing a layer of molten magnesium on top of said layer of magnesium chloride;
    (c) introducing gaseous chloride of the product metal above said magnesium, thereby causing a reaction which produces product metal chunks which settle through said molten magnesium chloride and collecting on top of the solid portion of magnesium chloride;
    (d) withdrawing a lower part of said solid magnesium chloride from said vessel and causing part of the molten magnesium chloride to be relocated adjacent to said cooling means, whereby the part of the molten magnesium chloride relocated adjacent to the cooling means solidifies and maintains a seal at the bottom of the vessel while product metal chunks are trapped within the solidified magnesium chloride and can be later withdrawn from said vessel together with solidified magnesium chloride; and
    (e) distilling said magnesium chloride containing product metal chunks to remove the magnesium chloride and residual magnesium and melting said metal chunks to form an ingot of product metal.

2. The process of claim 1, wherein magnesium is at least periodically added vessel, and wherein magnesium chloride is at least periodically withdrawn from said vessel, whereby said process becomes a continuous process.

3. The process of claim 1, wherein the magnesium chloride containing product metal is placed in a form made of product metal while being distilled to remove the magnesium chloride and the magnesium.

4. The process of claim 3, wherein said form is cylindrical and essentially the shape of an electron-beam melter feed ingot, whereby after distillation, the consolidated metal chunks and the form containing said chunks can be directly melted in an electron-beam melter.

5. The process of claim 3, wherein said form is cylindrical and essentially the shape of a vacuum-arc melter feed electrode, whereby after distillation, the consolidated metal chunks and the form containing said chunks can be directly melted in a vacuum-arc melter.

6. The process of claim 1, wherein the magnesium-containing product metal is distilled on a crucible and the consolidated chunks are rolled to produce a spar for vacuum-arc melting.

7. The process of claim 6, wherein said product metal is zirconium.

8. The process of claim 1, wherein said product metal is titanium.

9. In a process of the type wherein a chloride of zirconium, hafnium, or titanium is reduced with magnesium to produce a product metal, and the product metal is subjected to a distillation process to remove residual magnesium and magnesium chloride; the improvement comprising:
(a) establishing a layer of magnesium chloride in a vessel, said magnesium chloride layer having an upper molten portion and a lower solid portion, said lower portion being located adjacent to a cooling means and maintaining a liquid tight seal at the bottom of said vessel;
(b) establishing a layer of molten magnesium on top of said layer of magnesium chloride;
(c) introducing gaseous chloride of the product metal above said magnesium, thereby causing a reaction which produces product metal chunks which settle through said molten magnesium chloride and collecting on top of the solid portion of magnesium chloride;
(d) withdrawing a lower part of said solid magnesium chloride from said vessel and causing part of the molten magnesium chloride to be relocated adjacent to said cooling means, whereby the part of the molten magnesium chloride relocated adjacent to the cooling means solidifies and maintains a seal at the bottom of the vessel while product metal chunks are trapped within the solidified magnesium chloride and can be later withdrawn from said vessel together with solidified magnesium chloride;
(e) adding magnesium at least periodically to said vessel;
(f) withdrawing magnesium chloride at least periodically from said vessel;
(g) placing the magnesium chloride containing product metal in a form made of product metal;
(h) subjecting said magnesium chloride containing said product metal in said form to a distillation process to consolidate said product metal in said form and to remove said magnesium chloride; and
(i) melting said consolidated product metal and said form to produce a product metal ingot.

10. The process of claim 9, wherein said form is cylindrical and essentially the shape of an electron-beam melter feed ingot, whereby after distillation, the consolidated metal chunks and the form containing said chunks can be directly melted in an electron-beam melter.

11. The process of claim 9, wherein said form is cylindrical and essentially the shape of a vacuum-arc melter feed electrode, whereby after distillation, the consolidated metal chunks and the form containing said chunks can be directly melted in a vacuum-arc melter.

12. The process of claim 10, wherein said product metal is zirconium, whereby especially low-oxygen, pure zirconium is produced.

13. In a process of the type wherein a chloride of zirconium is reduced with magnesium to produce zirconium metal, and zirconium metal is subjected to a distillation process to remove residual magnesium and magnesium chloride; the improvement comprising:
(a) establishing a layer of magnesium chloride in a vessel, said magnesium chloride layer having an upper molten portion and a lower solid portion, said lower solid portion being located adjacent to a cooling means and maintaining a liquid tight seal at the bottom of said vessel;
(b) establishing a layer of molten magnesium on top of said layer of magnesium chloride;
(c) introducing gaseous zirconium tetrachloride above said magnesium, thereby causing a reaction which produces zirconium chunks which settle through said molten magnesium chloride and collecting on top of the solid portion of magnesium chloride;
(d) withdrawing a lower part of said solid magnesium chloride from said vessel and causing part of the molten magnesium chloride to be relocated adjacent to said cooling means, whereby part of the molten magnesium chloride relocated adjacent to the cooling means solidifies and maintains a seal at the bottom of the vessel while zirconium metal chunks are trapped within the solidified magnesium chloride and can be later withdrawn from said vessel together with solidified magnesium chloride;
(e) adding magnesium at least periodically to said vessel;
(f) withdrawing magnesium chloride at least periodically from said vessel;
(g) placing the magnesium chloride containing zirconium metal in a form made of zirconium metal;
(h) subjecting said magnesium chloride containing said zirconium metal in said form to a distillation process to consolidate said zirconium metal in said form and to remove said magnesium chloride, said form being cylindrical and essentially the shape of an electron-beam melter feed ingot;
(i) melting said consolidated zirconium metal and said form in an electron-beam melter to produce a zirconium metal ingot.

* * * * *